United States Patent [19]

Bacino

[11] Patent Number: 4,902,423
[45] Date of Patent: Feb. 20, 1990

[54] HIGHLY AIR PERMEABLE EXPANDED POLYTETRAFLUOROETHYLENE-MEMBRANES AND PROCESS FOR MAKING THEM

[75] Inventor: John E. Bacino, Landenberg, Pa.

[73] Assignee: W. L. Gore & Associates, Inc., Newark, Del.

[21] Appl. No.: 305,839

[22] Filed: Feb. 2, 1989

[51] Int. Cl.$^4$ ............... B01D 13/00; B01D 29/08
[52] U.S. Cl. ............... 210/500.36; 55/528; 210/507
[58] Field of Search ............... 210/507, 503–505, 210/508, 500.38; 427/393.5; 428/306.6, 308.4, 91, 229, 245, 260, 265, 422; 55/527, 528, DIG. 45; 528/28

[56] References Cited

U.S. PATENT DOCUMENTS

| | | |
|---|---|---|
| 3,953,566 | 4/1976 | Gore . |
| 3,962,153 | 6/1976 | Gore . |
| 4,025,679 | 5/1977 | Denny ............... 210/507 |
| 4,096,227 | 6/1978 | Gore . |
| 4,187,390 | 2/1980 | Gore . |
| 4,248,924 | 2/1981 | Okita . |
| 4,482,516 | 11/1984 | Bowman et al. . |
| 4,598,011 | 7/1986 | Bowman . |
| 4,814,412 | 3/1989 | Crowther ............... 528/28 |

Primary Examiner—Frank Sever
Attorney, Agent, or Firm—Gary A. Samuels

[57] ABSTRACT

A thin, low density porous polytetrafluoroethylene membrane having very large pores and heretofore unknown high air permeabilities is described. The membrane is produced by a particular series of longitudinal and transverse stretching steps carried out under particular conditions.

7 Claims, 3 Drawing Sheets

4,902,423

HIGHLY AIR PERMEABLE EXPANDED POLYTETRAFLUOROETHYLENE MEMBRANES AND PROCESS FOR MAKING THEM

FIELD OF THE INVENTION

The present invention relates to thin expanded porous polytetrafluoroethylene products. More particularly, it relates to thin porous polytetrafluoroethylene membranes which have very large pores and so high permeabilities to air, i.e. Frazier numbers between 100 and 300. The membranes have a unique open structure and are particularly suitable for use as air or liquid filtration media, as substrates for coatings, and other uses as will be obvious to those skilled in the art.

BACKGROUND OF THE INVENTION

Expanded porous polytetrafluoroethylene products are well known, as for example in U.S. Pat. Nos. 3,953,566 and 3,962,153. The products described therein have air permeabilities on the order of 0.032 metric permeability units (which corresponds to a Frazier number of 0.67). U.S. Pat. No. 4,187,390 describes such products having air permeabilities on the order of 0.6 metric units (which corresponds to a Frazier number of 12). U.S. Pat. No. 4,598,011 also describes such products having air permeabilities expressed as Gurley numbers of 6.5 to 27.5 seconds (which corresponds to Frazier numbers of 0.48 to 0.11).

Heretofore, expanded porous polytetrafluoroethylene membranes with air permeabilities greater than about Frazier numbers of 70 were commercially unknown. Similarly, the production of thin membranes with densities of 0.2 g/cc. or below and porosities at or above 90% and thicknesses below one mil usually led to products which were too fragile to handle.

It is desirable to provide membranes with higher air permeabilities and greater efficiencies. Typically, air filtration to achieve very low particulate contamination in the filtered air has been performed with membranes with small pores and with high efficiencies of particulate capture. Efficiency is a measure of the number of particles of a predefined size which are prevented from penetrating a filter. In the computer disc drive industry, where extreme cleanliness is imperative to success, it is recognized that it is more important to reduce particulate contamination quickly by recirculating the air more rapidly through a more permeable, less efficient filter, and to get to a similar level of total contamination as one would get more slowly with a high efficiency filter. To achieve this end, polytetrafluoroethylene membranes with much higher air permeabilities than have been available heretofore were required. Commercially available porous expanded polytetrafluoroethylene membranes for filtration membranes have air permeabilities of up to a Frazier number of 70 and efficiencies of about 93% when challenged with sodium chloride (0.3 um particle size) aerosols at 10.5 feet per minute face velocity.

SUMMARY OF THE INVENTION

This invention provides thin, porous low density expanded polytetrafluoroethylene membranes with very large pores and very high air permeabilities. The open membranes or webs have structures defined by series of rows of nodes running transversely across the membrane. The membranes of the invention have porosities equal to or greater than 95%, densities of 0.2 g/cc or less, thickness below 1 mil and air permeabilities between 100 and 300 Frazier numbers.

To obtain the membrane of this invention it is necessary to first stretch the membrane tape while wet with extrusion aid. This is done by stretching the wet tape to at least 1.5 times, preferably 2 to 4 times its original width. It has been found that when said wet stretching is included in the process, the ability of the subsequently dried tape to longitudinally expand is markedly increased. If the stretching is done in several steps, many tapes can be expanded up to 30 times their original length. Subsequent transverse stretching to at least 1.5 times, preferably 6 to 11 times the original width. Preferably, this last stretch step is followed by sintering to amorphously lock the membrane structure provides very open diaphanous webs.

During initial longitudinal stretching, rows of nodes are formed which are substantially continuous bars of dense tightly packed particles in which nodes are connected to nodes transversely and the rows of nodes are connected to each other longitudinally by fibrils. During continued stretching, the bars of nodes form smaller individual (usually less than 10 um in the largest dimension) nodes or clumps of small nodes, which are joined to each other by fibrils and the rows of nodes are joined to each other by very long fibrils. When stretching approaches the top limits of the invention, providing membranes with Frazier numbers of 200 to 350, the nodes are virtually all separated and have themselves begun to have a fibrillated structure.

It has also been found that the openness or permeability of said membranes is increased by using larger amounts of extrusion aid, up to the limit of the particular resin to provide a coherent and uniform extrudate.

Figure 4:
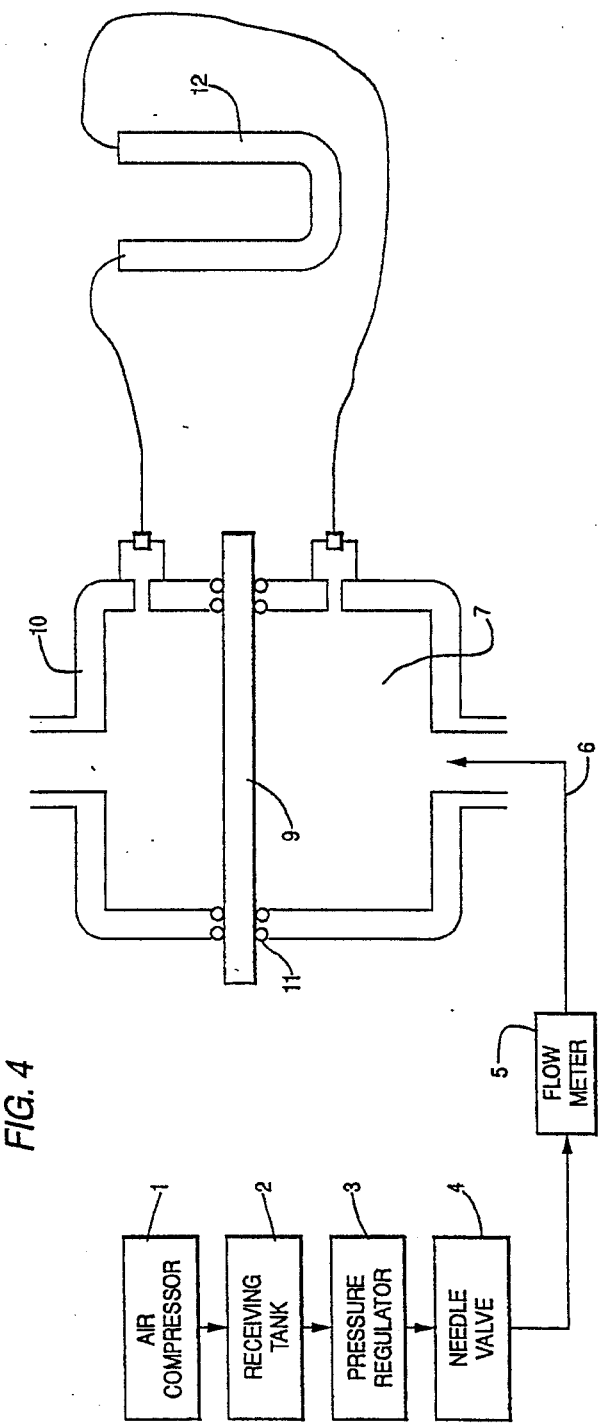

The drawings in FIG. 4 depicts the device used for measuring the air resistance of the membrane from which the permeability in Frazier numbers is calculated. The source of air (1) compressor feeds a receiving tank and the air flows thin through a pressure regulator 3 and needle value 4 to adjust the flow measures by flowmeter 5. A known amount of air 6 at a controlled flow rate passes into the upper stream chamber 7 which holds the sample membrane 9 sealed to the down stream chamber 10 by seals 11. The resistance to flow of the air induced by the membrane is measured in a water-filled u-tube manometer 12.

DESCRIPTION OF THE INVENTION

The products of this invention are thin, porous, low density membranes of expanded polytetrafluoroethylene whose structures are defined by a series of rows of nodes running transversely across the membrane. These nodes appear early in the longitudinal stretching process as bars of dense, tightly packed particles; the bars can be considered to consist of nodes connected to nodes transversely and the series of bars are connected to other bars longitudinally by fibrils. After longitudinal and transverse stretching as described herein the bars have become broken up and form very small particles or clumps of particles (or small nodes) usually 10 um or less in the longest dimension. The small nodes are joined to other such nodes by fibrils and bundles of fibrils and the series of rows are joined longitudinally by very long fibrils. When the stretching is carried out to provide membranes with Frazier numbers of about 100 or above, even the nodes appear to take on a fibrillated nature.

The pores in these membranes are so large that the usual method of estimating pore size by ethanol or methanol bubble point fails. Using scanning electron micrographs and physically measuring the dimensions the majority of the pores appear to have areas of about 40 um² to 200 um². Membranes of this invention have air permeabilities of 100 to 300 Frazier numbers preferably 150–300, and filtration efficiencies of 35% to 60% at 0.3 um particle size.

Air permeability, as used herein, is expressed as Frazier numbers, which ordinarily means the volume of air in cubic feet passing through one square foot of sample under a differential pressure of 0.50 inches of water per minute. Herein, the Frazier number is a calculated value determined from the air resistance measurements described herein. The calculation is:

$$\frac{133.33}{\text{mm water resistance}} = \text{Frazier Number}$$

Porosity as used herein is determined by the equation:

$$\text{Porosity} = 100 \frac{2.2 - S.G. \text{ of sample}}{2.2}$$

The polytetrafluoroethylene used herein is coagulated dispersion or fine powder polytetrafluoroethylene. Several such resins that have been used demonstrate that the various commercially available fine powders from the several suppliers of such resins are suitable in the process. Some such resins can tolerate more extrusion aid than others and still yield products within the range of permeability desired. Some such resins suitable for use are Fluon® CD-123 and Fluon CD-1 available from ICI Americas, Inc., although there is some batch to batch variability which alters how much they can be expanded. E. I. duPont de Nemours and Co., Inc., also manufacture Teflon® fine powders that are suitable for use.

The coagulated dispersion powders are lubricated with 130 cc/lb to 250 cc/lb of a hydrocarbon extrusion aid, preferably an odorless mineral spirit such as Isopar K (made by Exxon Corp.). The lubricated powder is compressed into cylinders and extruded in a ram extruder to form tapes. The tape is compressed between rolls to an appropriate thickness, usually 5 to 10 mils. The wet tape is stretched to 1.5 to 5 times its original width. The extrusion aid is driven off with heat. The dried tape is then expanded longitudinally between banks of rolls in a space heated to a temperature that is below the polymer melting point (327° C.). The longitudinal expansion is repeated up to 6 times to a total expansion of at least 5 times and up to 30 times the original tape length.

In each step of longitudinal expansion, the payoff rolls can be made to rotate more slowly than the take-up rolls so effecting the expansion. The tape is allowed to neck down, both transversly and in thickness during the longitudinal expansion. Care must be taken to avoid splitting of the tape during these expansions.

Next, the tape, after the longitudinal expansion, is expanded transversely at a temperature that is less than 327° C. to at least 1.5 times and preferable to 6 to 11 times the width of the original extrudate while restraining the membrane from longitudinal contraction. While still under constraint the membrane is preferably heated to above the polymer melting point (327° C.) and then cooled.

The effect of varying the amount of extrusion aid on the permeability of the final film is illustrated in the examples. Briefly, increased amounts of extrusion aid result in increased air permeability (or lower resistance to air flow) in the membranes made with the same amount of expansion. Generally, for this process extrusion aid levels below about 130 CC/pound of resin are not used. The particular polytetrafluoroethylene resin being used largely determines the maximum amount of extrusion aid that can be used. Some resins are more tolerant to large amounts of lubricant, whereas others require less. Over-lubricated powders produce nonuniform extrudates which tend to fracture during expansion. Similarly, the permeability of the final membranes increases with increased amounts of expansion at the same lubricant level. This too is illustrated in the examples.

It is unexpected and surprising, and contrary to previous experience that a general purpose polytetrafluoroethylene coagulated dispersion powder such as Fluon® CD-1, should expand to the extent needed to provide the products of this invention. In fact, in this process, some batches of Fluon CD-1 out perform Fluon CD-123, providing membranes with higher Frazier numbers from similarly lubricated powders and similar amount of expansion than does Fluon CD-123.

The longitudinal expansion provides the row of nodes connected by nodes and some fibrils across the tape and long longitudinal fibrils which connect the rows. The transverse expansion breaks or cracks the clumps of nodes or bars to provide very small nodes with many fibrils connecting node to node both in the transverse and longitudinal directions. This creates an open or porous structure.

It is this open, but strong structure that provides the high permeability of the membranes or webs of this invention, and provides extremely thin, highly porous and very low density, while still having sufficient strength for use in filtration.

Figure 1:
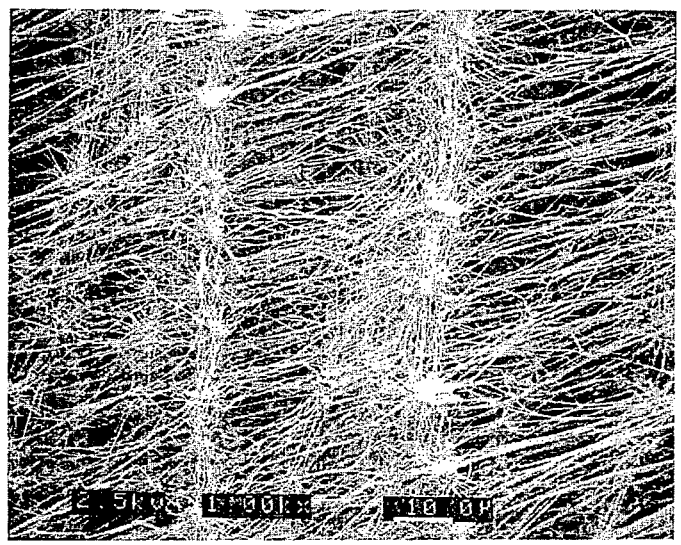
FIG. 1 is a Scanning Electron Micrograph of the membrane of Example 6 in Table II at 1000 magnifications illustrating the rows of transverse fibrillated nodes connected by bundles of fibrils and the longitudinal fibrils forming large pores.
Figure 2:
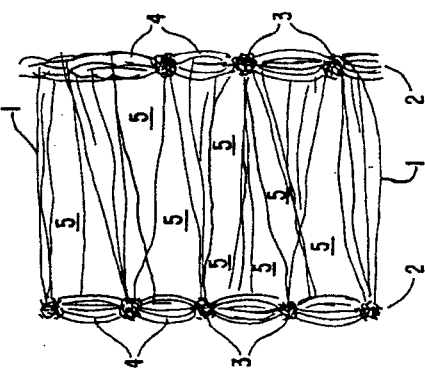
FIG. 2 is a drawing depicting the structure seen in FIG. 1. The long fibrils 1 connect the rows 2 of transverse fibrillated nodes 3 connected by bundles of fibers 4 resulting in large open pores 5.
Figure 3:
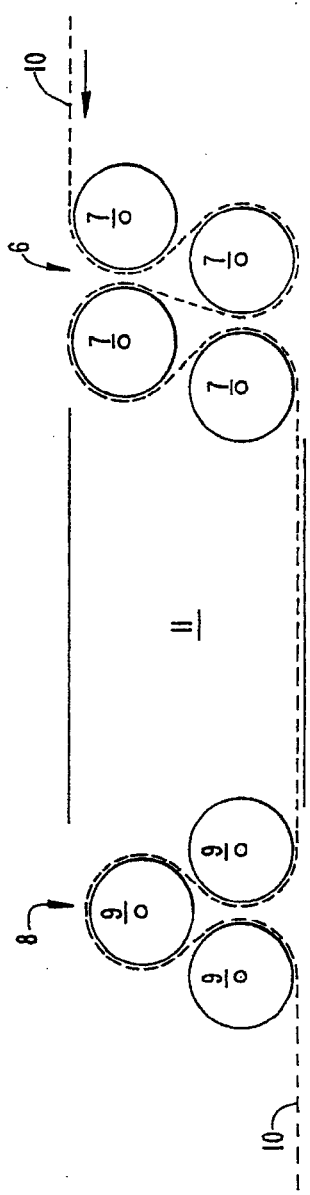
FIG. 3 is a drawing depicting the equipment used for longitudinal expansion consisting of a bank 6 of feed rolls 7 and a bank 8 of take up rolls 9 through which the tape 10 is threaded, passing through heating zone 11.

In a preferred embodiment, the polytetrafluoroethylene coagulated dispersion powder is lubricated with 140 to 190 cc. of Isopar K extrusion aid per pound of resin. The lubricated powder is compressed into a cylinder and extruded in a ram extruder to provide a tape. The tape is compressed between rollers to between 5 and 10 mils and is stretched transversely to 2 to 4, most preferably 3 times its original width. The lubricant is driven off by heating to about 210° C. Longitudinal expansion is performed in an apparatus as illustrated in FIG. 3. The dried tape is fed into a bank of 3 or 4 rolls which are driven at a controlled but variable speed. The tape passes through a zone heated to a temperature below the polymer melting point (327° C.) preferably to 250° to 300° C. and then into a second bank of 3 rolls which are driven independently of the first bank and whose speed is also variable. Expansion takes place by having the second set of rolls rotating more rapidly than the first bank. The tape is expanded longitudinally in 2 to 6 steps to a total of from 1.5 times to up to 30 times its rolled down length, depending upon the air permeability desired. During the longitudinal expansion the tape both narrows and thins due to necking. The tape is then expanded transversely at a temperature below its polymer melting point (327° C.) preferably at 250° to 300° C. to 7.0 to 11 times its original extruded width. The transverse expansion is performed while constraining the membrane from longitudinal shrinkage. The membrane is heated to above the polymer melting point (327° C.), more preferably to 360° C. and then cooled.

When performed under the aforedescribed conditions, highly porous, very thin expanded polytetrafluoroethylene membranes with permeabilities to air up to Frazier numbers of 300 are produced.

Physical properties of a typical membrane (Example 3) produced by this invention are shown in Table I.

The products of this invention find use in air filtration equipment used in areas demanding rapid attainment of extreme cleanliness, in surgical masks, vacuum cleaner filters or bags, exhaust filters and generally in recirculating filtration equipment.

TABLE I

| Membrane of Example 3 Properties | |
|---|---|
| Frazier Number | 196 |
| Density (g/cc) | 0.09 |
| Porosity (%) | 96 |
| Thickness (mils) | 0.3 |
| Water Entry Pressure (psi) | 0.36 |
| Filtration efficiency with 0.3 μm aerosol | 46.9 |
| Matrix Tensile Strength (psi)* | 21292 ± 3002 |

*Matrix tensile strength is determined by dividing the maximum force to break by the cross sectional area of the sample and multiplying by the ratio of the specific gravity of the solid polymer divided by the specific gravity of the sample material.

Thickness

Thickness is determined from one ply of membrane 5 inches by 5 inches square using shim stock so as not to compress the membrane while measuring thickness with calipers.

Density

Density is determined by weighing the 5 inch by 5 inch square membrane used to determine thickness and calculating the density.

Tensile Strength

Tensile strength is determined by the method described in ASTM D882.

Water Entry Pressure

Water entry pressure was measured by mounting a membrane sample on a test plate taking care not to damage the membrane. The sample was then placed over a water filled J tube was then pressurized in small increments, waiting 30 seconds after each change of pressure and watching for the first signs of water break through in the center of the film (to avoid erroneous results from damaged edges). The pressure at break through was recorded as the water entry pressure. A minimum of four samples were tested and the average of the results was reported.

Air Permeability

Air permeability is calculated using the resistance to flow measurements.

For the purposes of this patent, "resistance" is defined, generally, as the differential pressure across a sheet of air filter media just sufficient to cause air to flow through the sheet at a chosen air velocity, and more specifically, as the differential pressure measured in mm of water column causing an air velocity of 3.2 m/min.

Resistance is measured as follows: a hollow test chamber is clamped about a sheet of media such that the sheet partitions the chamber interior into two separate compartments, and such that the junction of the chamber walls and the sheet is throughout its perimeter well sealed. This sheet has some known area exposed to the chamber interior as defined by the inner perimeter of the seals.

The chamber compartment that is on one side of the sheet is freely vented to the atmosphere. On the other side of the sheet, the other compartment is sealed to some source of controlled air flow. This source is provided by an air compressor, a receiving tank, a pressure regulator, a needle valve, and a flowmeter.

The air source is adjusted to deliver the correct air flow, equal to the aforementioned known sheet area multiplied by the desired air velocity (and therefore having the correct dimensions of volume per unit time). For example, if the sheet area defined by the seals is 0.15 m², the correct flow would be:

$$(0.15 \text{ m}^2) \times (3.2 \text{ m/min.}) = (0.48 \text{ m}^3/\text{min})$$

A sensitive differential pressure sensing device, such as a water-filled "U" tube or an electronic transducer, is connected to the two chamber compartments such that it registers the pressure differential across the sheet.

The sheet sample's resistance is measured by sealing the sheet between chamber parts, establishing the correct air flow through the chamber and sheet, and detecting the resultant differential pressure.

Moreover, additional optional precautions to improve the accuracy of measurement include the chamber being double-walled and the seals doubled, such that a guard zone separately surrounds the known sheet area, and this surrounding space plumbed to transport additional air identically through the guard zone, such that the inner seal which defines the known area envoys equal pressures within and without, and zero leakage is guaranteed from the critical inner chamber.

Also, the flowmeter is a precalibrated laminar flow element, whose linear differential pressure output is read by the same pressure instrument through valving, such that scaling and viscosity (temperature) errors are to a first order cancelled and the determination is in fact rationmetric.

The ratio of absolute pressures is measured between the flowmeter and the downstream chamber compartment, and an ideal gas law correction is applied, such that a volumetric flow is rightly determined at the downstream face of the sheet.

Using resistance values in mm water pressure across the sample, Frazier numbers are calculated by:

$$\frac{133.33}{\text{mm H}_2\text{O}} = \text{Frazier number}$$

Efficiency Testing

The filter efficiency testing is done using a similar apparatus/housing as the resistance test. A well mixed, sodium chloride aerosol in an air stream with a known velocity is directed thru a sample of air filter media. A small sample is taken of the challenge air stream and the penetrating air stream. The samples are channelled thru to dual laser particle counters which give an accurate count of the sodium chloride particles in each air stream. A penetration value is the ratio of the counts of particles larger than 0.3 um in the penetrating air stream/counts of particles larger than 0.3 um in the challenge air stream. The % efficiency value is 100 minus percent penetration.

EXAMPLES

The table illustrates the effect of different hydrocarbon extrusion aid lubricant levels and of stretch lengths on the air permeabilities of the membranes.

Examples 2 and 3 demonstrate the degree of repeatability of the process. Examples 1 and 2 demonstrate the effect of higher longitudinal expansion at constant extrusion aid levels on to air permeability.

EXAMPLE 5

Polytetrafluoroethylene fine powder, Fluon® CD-1 (available from ICI Americas, Inc.) was blended with Isopor K (available from Exxon Corp.) at the rate of 170 cc of Isopar K/pound of fine powder. The lubricate powder was compressed into a cylinder and was ram extruded to provide a tape. The tape was compressed between rolls to a thickness of 7½ mils and was stretched transversely to 2.4 times its original width. The Isopar K was driven off by heating to 210° C. The dry tape was expanded longitudinally between banks of rolls in a zone heated to 250° C. The ratio of speeds of the second bank of rolls to the first bank of rolls was 1.5/1 in the first pass and 5.8/1, 1.5/1 and 1.5/1 in subsequest passes for a total of 19.6 times total longitudinal expansion. The tape was heated to 250° C. and transversely expanded to 7.4 times the width of the extrudate while constrained from shrinkage and then to 360° C. while still constrained. The membrane had a density of 0.2 g/cc, its air permeability was a Frazier number of 156 and it had a efficiency of 66.3% of 0.3 um particles.

EXAMPLES 1-4 and 6

Other examples were made using the above procedure with various polytetrafluoroethylene coagulated dispersion powders. The only operating variables were the amount of extrusion aid used and the total amount of longitudinal expansion. These operating variables are shown in Table II with the air resistance, the air permeability in Frazier numbers and the percent efficiency in capturing 0.3 um and larger particles for each sample.

TABLE II

| | Manufacture of Membranes with a Broad Range of Air Permeability* | | | | |
|---|---|---|---|---|---|
| Example | Lubricant cc/lb | Longitudinal Expansion (total) | Resistance MM H₂O | Frazier Numbers | Efficiency % |
| 1 | 160 | 22.2 | .95 | 140 | 49.5 |
| 2 | 160 | 28.0 | .69 | 202 | 55. |
| 3 | 160 | 28.0 | .68 | 196 | 46.9 |
| 4 | 175 | 25.0 | .45 | 296 | 34.4 |
| 5 | 170 | 19.6 | .85 | 156 | 66.3 |
| 6 | 170 | 27.0 | 1.21 | 110 | 84.5 |
| Comparison** | 200 | 8.7 | Failed to Expand | | |

*Air permeability as expressed by resistance to air flow in mm H₂O and 10.5 fpm space velocity and as Frazier numbers
**At 200 cc/lb lubricant, the material could not be expanded beyond 8.7/1 and produced non-uniform membrane when expanded transverly.

What is claimed:

1. A thin, low density, porous polytetrafluoroethylene membrane having an open structure defined by small nodes interconnected with fibrils, said membrane characterized by having a porosity equal to or greater than 90%, a density of 0.2 g/cc or less, and permeabilities to air between Frazier numbers of 100 and 350.

2. The membrane of claim 1 wherein the majority of the nodes are arranged in series of generally aligned parallel rows across the membrane, and are connected node to node by fibrils and bundles of fibrils and the rows are connected to each other by long fibrils.

3. The membrane of claim 2 wherein the membrane is a film of a thickness of less than 1 mil.

4. The membrane of claim 3 wherein the permeability to air is between Frazier numbers of 150 to 300.

5. An air filtration device comprising a frame and a membrane defined as in claim 1 held in said frame.

6. The membrane of claim 1 wherein the membrane is a film of a thickness of less than 1 mil.

7. An air filtration device comprising a frame and a membrane defined as in claim 1 held in said frame.

* * * * *